United States Patent Office 3,375,569
Patented Apr. 2, 1968

3,375,569
METHOD OF MANUFACTURE OF STRUCTURES HAVING CONTROLLED POROSITY
Robert L. Eichinger, Pittsburgh, and Richard T. Begley, Penn Hills, Pa., assignors to Westinghouse Electric Corporation, Pittsburgh, Pa., a corporation of Pennsylvania
Filed Jan. 30, 1964, Ser. No. 341,313
9 Claims. (Cl. 29—419)

The present invention relates to a method of manufacturing a structure of controlled porosity in which both the spacing and the size of the pores and the shape thereof can be controlled within limits. More particularly, a porous structure together with its method of manufacture is contemplated as being readily fabricated from a high temperature material such as one of the high-melting or refractory metals.

There are many applications throughout various industries for porous structures or bodies. For example, in the chemical industry there is considerable demand for filter material or structures having a carefully controlled porosity or opening size.

The method of the invention can also be utilized in producing porous structures for gas metering devices and many other applications where controlled porosity is required. The invention is particularly useful for producing porous structures for the above-mentioned or other applications where the pores or openings must be microscopic or nearly microscopic in size.

More recently, considerable interest is developing in ion propulsion engines for space applications. In the ion engine, cesium or other relatively volatile metal is ionized by causing it to evaporate from a porous emitting electrode, which is fabricated from tungsten or other high-temperature, low work-function material. However, in order to achieve efficient ionization of the cesium with low concentration of neutral (unionized) cesium atoms, the pore sizing and spacing, permeability and cleanliness of the porous electrode must be carefully controlled.

Heretofore it has been the practice to produce the aforementioned porous structures either by powder-metallurgy or by wire-bundling techniques. These methods resulted in porous structures which are far from uniform in pore size and spacing and in permeability. In other previously known methods, the windings were removed from the spool and placed in a tubular member and the tubular member containing the wires was swaged as a unit. However, the swaging technique did not produce or maintain the close packed arrangement of the wire, and consequently non-uniform void size and spacing resulted.

Accordingly, an object of the present invention is the provision of methods of manufacture of porous structures of controlled pore size, spacing, and shape.

A further object of the invention is the provision of methods of manufacture of porous structures of the character described wherein the structures are fabricated from a high temperature or refractory material.

Still another object of the invention is a method of manufacturing porous structures having uniform pore size and shape and uniform spacing therebetween.

These and other objects, features and advantages of the invention will be elaborated upon during the forthcoming description of illustrative modifications of the invention when taken in conjunction with the accompanying drawings, wherein.

Figure 1:
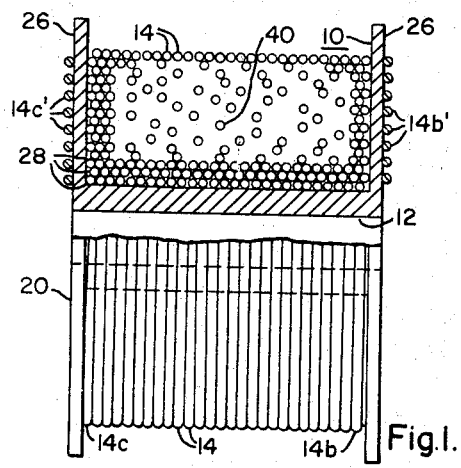
FIGURE 1 is an elevational view, partially sectioned, of a porous structure of control porosity made in accordance with the invention and illustrating preliminary steps in the method of manufacture, and taken along reference line I—I of FIG. 2.
Figure 2:
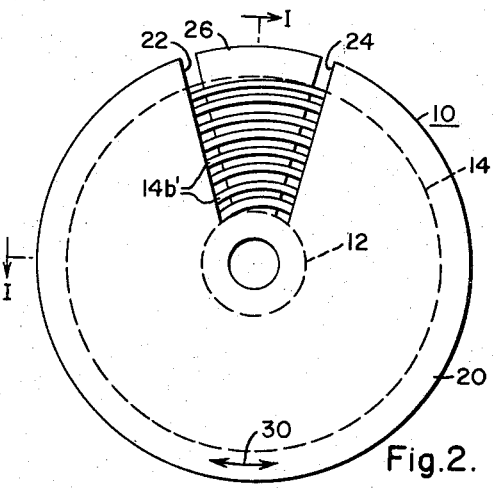
FIG. 2 is a right elevational view of the structure illustrated in FIG. 1.

Referring now to FIGS. 1 and 2 of the drawings the method and article of the invention are preliminarily exemplified by a spool or bobbin 10, upon the central spindle or hub 12 of which is provided a relatively large number of windings 14. The windings 14 are precisionally wound, in the manner described more fully hereinafter, into a closely fitting array as evident from the sectioned, upper portion of FIG. 1. Thus, it is contemplated by the method of the invention that each subsequent row of windings will be laid in the valleys or between the lands of the pitch defined by the preceding row of windings and that the direction of the pitch will not be reversed as in conventional pool winding techniques. Accordingly, in the array of windings 14 as shown, each single winding within the mass of windings on the spool 10 will engage and be engaged by six adjacent windings 14. In conventional winding techniques, on the other hand, each of the aforementioned windings will engage as few as two adjacent windings.

Figure 7:
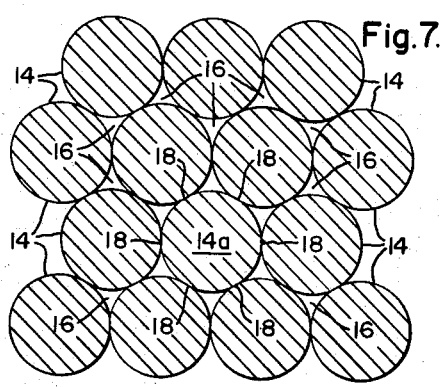
FIG. 7 is an enlarged, partial, cross-sectional view of the upper portion of the winding structure shown in FIG. 1.

As better shown in FIG. 7 of the drawings, a section through a portion of the mass of windings 14 shows that the latter are disposed in a triangular, latticed array with all of the windings being closely fitted so that the spaces or openings 16 therebetween are all of the same, controlled size. The distance between the openings or spaces 16 is, of course, related to the diameter of the windings 14, which also control the size of the opening 16.

In one application of the invention, i.e., wherein the porous structure is to be used as the aforementioned electrode for an ion emitter the mass of windings 14 is wound from tungsten wire of one mil in diameter. Of course, wires of different diameters and different materials can be employed depending upon the ultimate application of the porous structure. As an example, for very small or microscopic pore sizes, present technoogy permits the use of tungsten wire having a diameter in the neighborhood of 0.2 mil. It is also contemplated that wires of differing diameters or of differing cross-sectional shapes can be employed and spaced throughout a single winding structure in accord with a predetermined pattern.

In the case of wires of circular cross section and of uniform diameters, the size and spacing of the void 16 will always bear the same relationship to the wire diameter, when the latter is wound in accordance with FIGS. 1 and 7. Thus, the void, size and distribution throughout the illustrated porous structure can be readily calculated from the wire diameter.

FIG. 7 also illustrates more fully the engagement of a given one of the windings 14 within the body of the porous structure, for example winding 14a, with substantially all of the adjacent windings 14, as denoted by reference characters 18. In this example, there are six such adjacent windings except where the given winding lies on the surface of the winding structure. As explained more fully hereinafter the line contacts 18 among the windings 14 are important to the final steps in the method of producing the porous structure of the invention.

Referring once again to FIGS. 1 and 2 of the drawings, one exemplary arrangement for precisionally placing the windings 14 on the spool 10 is also illustrated therein. Such arrangement includes a pair of slots in each spool flange 20, for example the slots 22 and 24 illustrated in FIG. 2 of the drawings. Each pair of slots 22, 24 thus isolates a flange sector 26 at each end of the spool 10. It is to be understood, of course, that the slots can be disposed to define a smaller or larger flange sector; for example, the slots can be cut so as to be diametrically opposed on each flange 20.

In precisionally winding the spool 10 the endmost winding 14b or 14c of each course or row of windings 28 is passed out through one of the slots 22 or 24 around the adjacent flange sector 26 and back into the spool 10. At the same time the direction of rotation, denoted by the double arrow 30 is reversed as the associated reentrant loop portion 14b', for example, is passed around the related flange sector 26, as seen in FIG. 2 of the drawings. As each course 28 of winding 14 reaches the other spool flange at the other end of the spool a similar reversal of the spool 10 is made with the result that reentrant winding loops 14c' are looped around the flange sector 26 at that end of the spool 10.

A precision traversing mechanism (not shown) through which wire is fed from a tensioned source (not shown), is then utilized for spacing the windings 14 of each course 28 of windings accurately in the grooves of the preceding course of windings. Each course of windings, therefore, has the same pitch and direction as the preceding windings. Of course, equivalent stop means can be utilized in place of the flange sectors 26, for example, a rod-like member (not shown) affixed to the hub 12 inwardly of each flange 20 but closely adjacent thereto. Or, the flange segment 26 can be removed and replaced with an upstanding rod member (not shown) affixed to the hub 12 and disposed generally in the plane of the associated flange 20.

In the case of the aforementioned tungsten wire, the tensioned source desirably maintains a pull equal to about one-fourth of the breaking strength of the wire. At this tension and wire diameter the hub 12 must be relatively thick-walled to withstand the total force accumulating from the many turns of wire. Of course, a greater or lesser tension can be utilized depending upon the strength of the hub, the wire diameter and material, and so on.

Before referring to FIG. 3 of the drawings, for the final steps in the method of producing the porous structures of the invention, several intermediate steps will now be described. After the winding 14 is completed as described above the entire wound spool 10 is in this case sintered for a time and at a temperature to cause bonding of each winding 14 to each of its adjacent windings and if desired, partially to close the voids 16 to a predetermined, smaller pore diameter. In the case of one mil tungsten wire, sintering can be accomplished, for example, at about 2200° C. for about two hours. For smaller diameter tungsten wire, the time desirably is reduced. When using refractory metals or other materials which are readily contaminated, vacuum sintering or sintering in an inert atmosphere is usually necessary to maintain the desired purity of the material comprising the wire windings 14. In the case of ion emitters for the aforementioned application the highest purity possible is of course a pre-requisite.

Following vacuum sintering a material having a substantially lower melting point can be infiltrated into the pores or voids 16 of the wound spool 10 to reduce or to eliminate altogether the tendency of the windings 14 (of certain materials) to smear during the subsequent cutting operation described below. (It has been found in many cases that such tendency is minimized in the case of tungsten wire.) An infiltrant material is selected which will be compatible with the material comprising the windings 14. An example of such material which can be utilized when a refractory metal such as tungsten comprises the windings 14, is copper.

Figure 3:
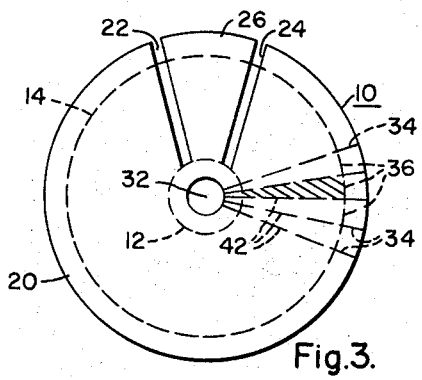
FIG. 3 is an enlarged elevational view of the porous structure illustrated in FIGS. 1 and 2 and showing additional steps in the method of the invention.

Following the sintering operation, and the infiltrant operation where used, porous structures can now be formed from the wound spool 10 by cutting the latter along planes desirably passing through the central axis 32 of the spool, i.e., along the dashed lines of FIG. 3 denoted by the reference character 34. When the cuts are thus made the porous structure 36 having been sintered as described above is then readily removed from the pieces of the spool 10 which are severed simultaneously therewith. The porous structure is now in the form of a truncated wedge as denoted by the shading 38 of FIG. 3. A frontal view of the porous structure 36 is of course rectangular and is similar to the sectioned portion 40 of FIG. 1. If the truncated wedge shape is objectionable the faces 42 (FIG. 3) of the porous structure can be made more nearly parallel by employing a spool having a substantially larger hub member 12 so that the wedge shaped porous structure of the same thickness subtends a lesser degree of arc at the outer rim of the spool flanges. True parallelism of course can be imparted to the faces 42 of the porous structure 36 by grinding after the slices are cut from the spool 10. After the cutting operation and after the grinding operation, if utilized, are completed the infiltrant material, where used, is then readily removed from the pores or voids 16, for example, by a vacuum heat treatment or the like. Any flowed or smeared metal from the cutting operations, particularly if the infiltrant operation is not utilized, can then be removed by light grinding and polishing.

It can be seen from FIG. 3 that a relatively large number of porous structures can thus be produced from a single wound spool 10 by slicing or cutting sections 36 of the proper size from the spool 10. In performing the method of the invention it is important that the wire be wound in a close packed arrangement at a constant tension and that the spool 10 with the windings 14 wound thereon to the desired depth be sintered before the wire is disturbed, so that the close packed arrangement is maintained during the subsequent steps of the method.

Figure 5:
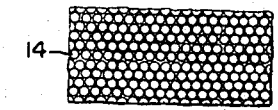
FIG. 5 is a photomicrograph of 75× magnification of a porous structure made in accordance with the invention.
Figure 6:
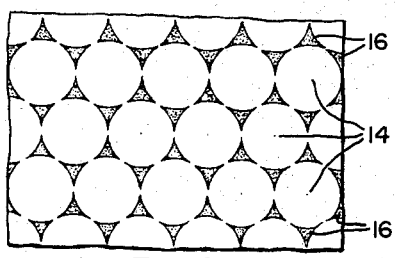
FIG. 6 is a photomicrograph of 500× magnification of a portion of the porous structure of FIG. 5.

Referring now to FIGS. 5 and 6 of the drawings the uniformity of the precisional windings and the size and distribution of the pores or voids therebetween are evident from photomicrographs of portions of the porous structure 36. As better shown in FIG. 6 of the drawings each of the windings 14 within the body of the porous structure 36 is physically bonded to the six adjacent windings 14. This bonding results from the sintering operation described above and is, of course, a solid state phenomenon which does not require melting of the material comprising the windings 14. As a rule of thumb, the material comprising the windings 14 must be heated to a temperature of about 60% of its melting point to promote a physical bond between adjacent windings by sintering. As noted before, prolonged sintering of the porous structure will tend to decrease the sizes of the pores or voids 16 so that a further degree of control over the size of the voids can be exercised other than by changing the diameter of the windings 14.

Figure 4:
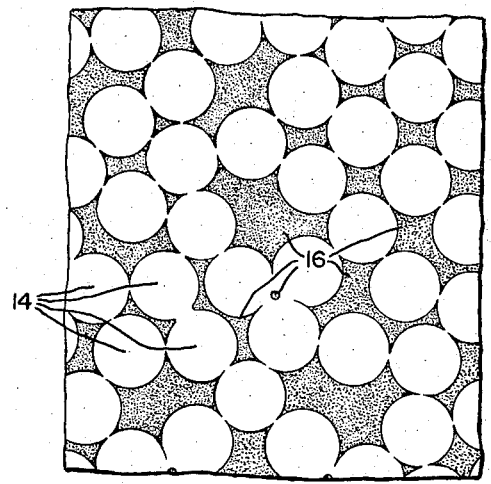
FIG. 4 is a photomicrograph of 500× magnification showing a portion of a porous structure made in accordance with a known technique of the prior art.

For purposes of comparison FIG. 4 is a photomicrograph corresponding in magnification to that of FIG. 6 and taken of a portion of a porous structure produced by conventional winding techniques, such as layer winding or wire bundling followed by a sintering operation, as otherwise described in accordance with the steps of the invention. From FIG. 4 it is seen that conventional wire winding techniques do not produce the uniform void size and spacing which is evident from the porous structure fabricated in accordance with the complete method of the invention and illustrated in FIGS. 5 and 6 of the drawings.

From the foregoing it will be apparent that novel and efficient forms of porous structures together with methods for making the same have been disclosed herein. As numerous equivalent modifications of the invention will occur to those skilled in the art without departing from the spirit and scope thereof, it will be appreciated that the descriptive and illustrative materials employed herein are for purposes of explaining the invention and are not to be taken as limitative thereof. Moreover, it is to be understood that certain features or steps of the invention can be employed without a corresponding use of other features.

Accordingly, what is claimed as new is:

1. A method of making porous structures, said method comprising the steps of winding a first row of wire on a winding support, said row having a large number of wire turns therein and having a predetermined pitch, winding subsequent rows of wire on said first row with each subsequent row having the same pitch as said first row so that each of said wire turns contacts substantially all of the immediately adjacent ones of said wire turns, bonding each of said turns to substantially all of its adjacent turns, and cutting sections from said turns generally transversely of the winding direction, said sections corresponding in thickness to the desired thickness of said porous structures.

2. The method of claim 1 wherein each of the wire turns in a subsequent row is laid between adjacent wire turns in the preceding row.

3. The method of claim 1 wherein the bonding is achieved by sintering the wire while wound on the support.

4. A method of claim 3 including the step of infiltrating said sintered and bonded turns with a material having a melting point lower than the sintering temperature of the material comprising said wire to limit smearing of said turns during the subsequent cutting step, and heating said cut sections to remove said infiltrant material.

5. The method of making porous structures of claim 4 including the step of grinding and polishing the cut surfaces of said porous structures to remove any smeared metal produced by the cutting step.

6. A method for producing porous structures of claim 3 wherein said support comprises a bobbin having dimensions of the cross-sectional area defined by its flanges and hub corresponding substantially to the major dimensions of said porous structures, said turns being wound on said bobbin from a tensioned source, and wherein said sections are cut from said bobbin and said turns substantially along relatively closely spaced planes passing through the central axis of said bobbin, the distance between said planes corresponding generally to the desired thickness of said porous structures.

7. The method of claim 3 wherein said sintering step is continued after bonding until each of the openings among said turns is reduced to a predetermined size.

8. A method of making porous structures, said method comprising the steps of placing a relatively large number of turns of wire of circular cross section on a winding support in a closely spaced array with each subsequent course of said windings having the same directional pitch as the preceding course so that each of said windings of the subsequent course is positioned in the valleys formed between adjacent wire turns of the preceding course whereby each winding contacts substantially all of the immediately adjacent ones of said windings, sintering said winding support and said turns of wire for a time and at a temperature sufficient to physically bond each of said turns to its adjacent turns, and cutting sections from said turns generally transversely thereof, said sections corresponding in thickness to the desired thickness of said porous structures.

9. A method for producing porous structures, said method comprising the steps of placing a relatively large number of turns of wire on a bobbin having dimensions of the cross-sectional area defined by its flanges and hub corresponding substantially to the major dimensions of said porous structures, said turns being placed in a closely spaced array by rotating said bobbin to wind wire thereon from a tensioned source and by reversing the rotation of said bobbin at the end of each course of turns so that each succeeding course of turns has the same directional pitch as the preceding courses, sintering said bobbin with the turns thereon for a time and at a temperature sufficient to physically bond each turn to substantially all of its adjacent turns, and cutting sections from said spool and said turns substantially along relatively closely spaced planes passing through the central axis of said bobbin, the distance between said planes corresponding generally to the desired thickness of said porous structures.

References Cited

UNITED STATES PATENTS 2,619,438  11/1952  Varian et al. _____ 29—423 X
2,857,657  10/1958  Wheeler _____ 29—163.5 X THOMAS H. EAGER, *Primary Examiner.*